United States Patent
Nakamura

(10) Patent No.: US 6,527,898 B1
(45) Date of Patent: Mar. 4, 2003

(54) TRANSFER MATERIAL, SURFACE-PROTECTIVE SHEET, AND PROCESS FOR PRODUCING MOLDED ARTICLE WITH THESE

(75) Inventor: Yuzo Nakamura, Muko (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/787,552

(22) PCT Filed: Sep. 29, 1999

(86) PCT No.: PCT/JP99/05314
§ 371 (c)(1),
(2), (4) Date: Mar. 20, 2001

(87) PCT Pub. No.: WO00/20228
PCT Pub. Date: Apr. 13, 2000

(30) Foreign Application Priority Data

Oct. 1, 1998 (JP) .......................................... 10-296212
Oct. 1, 1998 (JP) .......................................... 10-296213

(51) Int. Cl.$^7$ .............................................. B44C 1/165
(52) U.S. Cl. ....................... 156/230; 156/239; 156/240; 156/272.2; 156/275.5; 156/277; 264/478; 264/511; 428/195; 428/913; 428/914; 428/204
(58) Field of Search .................................. 156/235, 277, 156/230, 239, 240, 272.2, 275.5; 264/478, 511; 428/195, 913, 914, 204

(56) References Cited

U.S. PATENT DOCUMENTS 5,001,177 A    3/1991    Winfried et al. .............. 524/86

FOREIGN PATENT DOCUMENTS

JP    6-263976    9/1994

(List continued on next page.)

*Primary Examiner*—Bruce H. Hess
(74) *Attorney, Agent, or Firm*—Wenderoth, Lind & Ponack, L.L.P.

(57) ABSTRACT

Disclosed is a transfer material comprising at least a substrate sheet having releasing property, and a protecting layer formed on one surface of the substrate sheet, wherein the protecting layer is composed of an active energy ray curable resin, the active energy ray curable resin being obtained by heat-crosslinking a heat and active energy ray curable resin composition which comprises, as an active ingredient, a polymer having a (meth)acryl equivalent weight from 100 to 300 g/eq, a hydroxyl value from 20 to 500 and a weight-average molecular weight from 5000 to 50000; a polyfunctional isocyanate; and a UV absorber;

characterized in that the UV absorber is a bisbenzotriazole-type UV absorber represented by the formula:

(1)

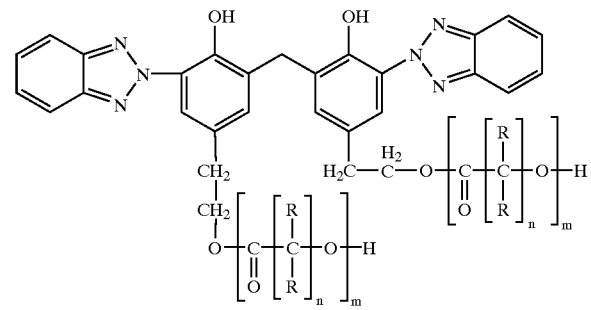

wherein R each independently represents a hydrogen atom, or an alkyl group having 1 to 10 carbon atoms, n each independently represents an integer of 4 to 8, m each independently represents an integer of 1 to 20. A protection coating excellent in transparency, weather resistance, abrasive resistance, and chemical resistance may be formed on the surface of a molded article at low cost without forming cracks at the curved part, by using the transfer material of the present invention.

13 Claims, 3 Drawing Sheets

FOREIGN PATENT DOCUMENTS

| | | |
|---|---|---|
| JP | 8-2192 | 1/1996 |
| JP | 8-132794 | 5/1996 |
| JP | 10-265557 | 10/1998 |
| JP | 11-152343 | 6/1999 |
| JP | 11-320768 | 11/1999 |

TRANSFER MATERIAL, SURFACE-PROTECTIVE SHEET, AND PROCESS FOR PRODUCING MOLDED ARTICLE WITH THESE

This application is a 371 of PCT/JP99/05314 filed Sep. 29, 1999.

TECHNICAL FIELD

The present invention relates to a transfer material, and a surface protecting sheet, which are used for preparing a molded article excellent in weather resistance, abrasion resistance, and chemical resistance; and a process for preparing a molded article excellent in weather resistance, abrasion resistance, and chemical resistance, by using them.

PRIOR ART

As a process for forming a protection coating excellent in abrasion resistance and chemical resistance on the surface of a molded article, there have been known to those skilled in the art the process in which a transfer material composed of a substrate sheet having releasing property, and a protecting layer formed thereon, is adhered to molded article so that the protecting layer faces the surface of the molded article, and the substrate sheet is then released; and the process in which a surface protecting sheet composed of a substrate sheet having no releasing property, and a protecting layer formed thereon, is adhered to a molded article so that the protecting layer faces outside, and the like.

For example, WO97/40990 describes a transfer material which is composed of a substrate sheet having releasing property, and a protecting layer consisting of a heat reactant of a heat and active energy ray curable resin composition. The publication also describes a process for forming a protection coating excellent in abrasion resistance, chemical resistance, and the like, on the surface of a molded article by using the transfer material. Specifically, the process comprises the steps of: adhering the transfer material to the surface of a molded article so that the protecting layer faces inside; releasing the substrate sheet; and irradiating the protecting layer which is transferred to the molded article with active energy ray to completely cure.

The publication additionally describes a surface protecting sheet which is composed of a substrate sheet having no releasing property, and a protecting layer consisting of a heat reactant of a heat and active energy ray curable resin composition. The publication also describes a process for forming a protection coating excellent in abrasion resistance, chemical resistance, and the like, on the surface of a molded article by using the surface protecting sheet. Specifically, the process comprises the steps of: adhering the surface protecting sheet to the surface of a molded article so that the protecting layer faces outside; and irradiating the protecting layer with an active energy ray to completely cure.

The protecting layer employed in the transfer material or the surface protecting sheet described herein, is comprised of a heat reactant of a heat and active energy ray curable resin composition. The heat and active energy ray curable resin composition means a resin composition which is curable in response to both heat and active energy ray, and does not completely cure till both the heat and the active energy ray are applied.

A heat and active energy ray curable resin composition originally may contain low molecular weight components, and it is generally tacky and flowable. However, when the heat and active energy ray curable resin composition is heated, the low molecular weight components are crosslinked and polymerized, and therefore the resulting heat reactant becomes tack free. However, the heat reactant is kept flexible because it have not yet irradiated with an active energy ray, and is in the state of semi-cured, and therefore cracks do not occur at the curved part even when the heat reactant is adhered along the surface of a molded article having complicated shape.

The transfer material or the surface protecting sheet described herein is convenient for handling because the protecting layer thereof is made of a heat reactant of a heat and active energy ray curable resin composition and is tack free, and cracks do not occur at the curved part even when adhered along the surface of a molded article having complicated shape because the protecting layer thereof is flexible.

The protecting layer may be irradiated with an active energy ray after it is placed on the surface of a molded article, and completely cured to become a protection coating excellent in abrasion resistance, chemical resistance, and the like.

On the other hand, it is known to the art that a UV absorber is added to a protection coating placed on the surface of a molded article to improve weather resistance of the molded article or the picture which is covered beneath the protection coating. For example, the above described publication sets forth that a UV absorber such as benzotriazole-type, and benzophenone-type, and the like is added to a protection coating of a transfer material, or a surface protecting sheet.

However, most of the conventional UV absorbers are low molecular weight crystalline compounds, and thereby various problems are caused. For example, the conventional UV absorber is volatilized out by heating or bled out with elapsing time because its molecular weight is low and its vapor pressure is high. As a result, it is difficult to supply sufficient long-period weather resistance to the beneath layer.

In addition, a protection coating of the surface of a molded article is generally thin, and a considerable amount of UV absorber have to be added in order to shield UV effectively. Whereas, it is known that the conventional UV absorber is poor in compatibility with a resin, and abrasion resistance and chemical resistance of the protection coating become poor when a large amount of the UV absorber is added to the protection coating. Transparency of a protection coating also generally becomes poor when a large amount of the UV absorber is added to the protection coating.

The present invention solves the above described problems. The object of the present invention is to provide a transfer material, and a surface protecting sheet, which is used for forming a protection coating excellent in transparency, weather resistance, abrasive resistance, and chemical resistance at low cost without forming cracks at the curved surface. The present invention also aims at providing a process for preparing a molded article excellent in weather resistance, abrasive resistance, and chemical resistance by using them.

SUMMARY OF THE INVENTION

The present inventors have intensively studied to solve the above described problems. As a result, they have found that the above described problems can be solved, by employing a heat and active energy ray curable resin composition which comprises, as an active ingredient, a specific polymer, polyfunctional isocyanate, and a specific UV absorber, in preparing a transfer material, or a surface protecting sheet.

That is, the protecting layer of a transfer material, or a surface protecting sheet of the present invention is composed of an active energy ray curable resin. The active energy ray curable resin is obtained by heat-crosslinking a heat and active energy ray curable resin composition which comprises, as an active ingredient, a polymer having a (meth)acryl equivalent weight from 100 to 300 g/eq, a hydroxyl value from 20 to 500 and a weight-average molecular weight from 5000 to 50000; a polyfunctional isocyanate; and a UV absorber;

characterized in that the UV absorber is a bisbenzbtriazole-type UV absorber represented by the formula:

(1)

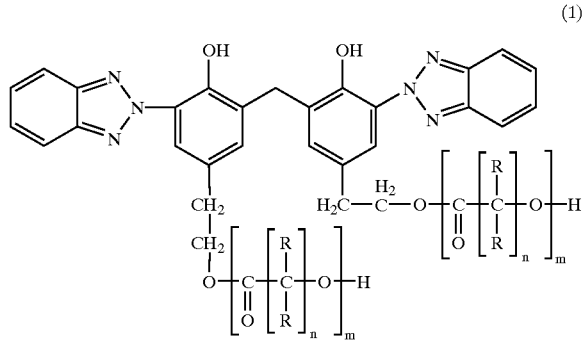

wherein R each independently represents a hydrogen atom, or an alkyl group having 1 to 10 carbon atoms, n each independently represents an integer of 4 to 8, m each independently represents an integer of 1 to 20.

One aspect of the present invention is a transfer material which comprises at least a substrate sheet having releasing property, and the above described protecting layer formed on one surface of the substrate sheet.

Another aspect of the present invention is a surface protecting sheet which comprises at least a substrate sheet having no releasing property, the above described protecting layer formed on one surface of the substrate sheet, and an adhesive layer formed on another surface of the substrate sheet.

When a molded article excellent in abrasion resistance, chemical resistance, and weather resistance is prepared by using the transfer material of the present invention, a process comprising the steps of: adhering the transfer material along the surface of a molded article; releasing the substrate sheet to transfer the protecting layer on the molded article; and irradiating the protecting layer transferred to said molded article with an active energy ray; may be employed.

When a molded article excellent in abrasion resistance, chemical resistance, and weather resistance is prepared by using the surface protecting sheet of the present invention, a process comprising the steps of: adhering the surface protecting sheet along the surface of a molded article; and irradiating the protecting layer of the surface protecting sheet with an active energy ray; may be employed.

Figure 1:
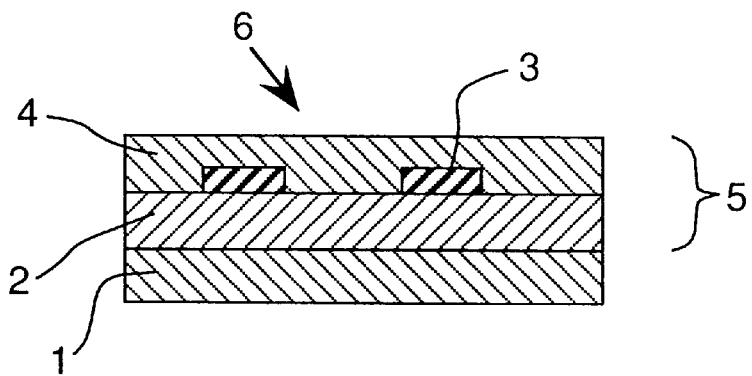
FIG. 1 is a schematic sectional view which shows one example of the transfer material according to the present invention.

In the drawings, 1 represents a substrate sheet, 2 represents a protecting layer, 3 represents a picture layer, 4 represents an adhesion layer, 5 represents a transfer layer, 6 represents a transfer material, 7 represents a molded article, 8 represents a heat resistant rubber-like elastomer, 9 represents a movable mold, 10 represents a fixed mold, 11 represents a molten resin, 12 represents a surface protecting sheet, 13 represents a heater, and 14 represents vacuum suction.

DETAILED DESCRIPTION OF THE INVENTION

First, the transfer material 6 of the present invention is described (FIG. 1).

As the substrate sheet 1 having releasing property, there can be used any material which is usually used as a substrate sheet of a transfer material 6, such as a sheet of a polypropylene-based resin, polyethylene-based resin, polyamide-based resin, polyester-based resin, polyacryl-based resin, polyvinyl chloride-based resin or the like, a metal foil such as an aluminium foil, copper foil or the like, a cellulose-based sheet such as a glassine paper, coat paper, cellophane or the like, a composite of the above described sheets, or the like.

When releasing property of the transfer layer 5 from the substrate sheet 1 is excellent, the transfer layer 5 may be applied directly on the substrate sheet 1. When releasing property of the transfer layer 5 from the substrate sheet 1 is poor, a releasing layer (not indicated) may be formed on the whole surface of the substrate sheet 1 before the transfer layer 5 is applied. The releasing layer is generally released from the transfer layer 5 together with the substrate sheet 1 when the substrate sheet 1 is released after transference, or after simultaneous molding and transference.

As a raw material of the releasing layer, a melamine resin-based releasing agent, silicone resin-based releasing agent, fluorine resin-based releasing agent, cellulose derivative-based releasing agent, urea rein-based releasing agent, polyolefin resin-based releasing agent, paraffin-based releasing agent, and composite releasing agent thereof can be used. As a forming process of the releasing layer, there are coating methods such as a gravure coating process, roll coating process, spray coating process, lip coating process, comma coating process and the like, and printing methods such as a gravure printing process, screen printing process and the like.

The protecting layer 2 is a layer which becomes a most outer layer of the transferred material by being released from the substrate sheet 1 or the releasing layer when the substrate sheet 1 is released after transference, or after simultaneous molding and transference, and protects the molded article 7 the picture layer 3 from a UV ray, a chemical agent or an abrasive action. The protecting layer 2 an energy ray curable resin obtained by heat-crosslinking a heat and active energy ray curable resin composition which comprises, as an active ingredient, a polymer having a (meth)acryl equivalent weight from 100 to 300 g/eq, a hydroxyl value from 20 to 500 a weight-average molecular weight from 5000 to 50000; a polyfunctional isocyanate; and the UV absorber represented by the following formula (1).

The polymer used for the protecting layer 2 is controlled to have specific characteristic values in order to satisfy the required physical or chemical properties of the protecting layer 2 after or before active energy ray irradiation. That is, the polymer has a (meth)acrylic equivalent weight from 100 to 300 g/eq, preferably from 150 to 300 g/eq, in view of curability on active energy ray irradiation. When the (meth)acrylic equivalent weight is more than 300 g/eq, abrasion resistance after active energy ray irradiation becomes insufficient. The polymer having a (meth)acrylic equivalent weight of less than 100 g/eq is difficult to be obtained.

The hydroxyl value of the polymer is from 20 to 500, preferably from 100 to 300, in view of reactivity with the polyfunctional isocyanate used together. When the hydroxyl value is less than 20, reactivity with the polyfunctional isocyanate becomes insufficient, and heat crosslinking degree of the protecting layer 2 of the transfer material 6 becomes low. Therefore, tack remains or solvent resistance decreases, and consequently, rolling and overprinting of the transfer material 6 become difficult. The polymer having a hydroxyl value of over 500 difficult to be obtained.

The weight-average molecular weight of the polymer is from 5000 to 50000, preferably from 8000 to 40000. When the weight-average molecular weight of the polymer is less than 5000, solvent resistance decreases or tack remains on the protecting layer 2 of the transfer material 6, and consequently, rolling and overprinting of the transfer material 6 become difficult, and a clear picture is not obtained. Further, when over 50000, viscosity of the resin becomes too high, and applying workability of the ink becomes poor.

The preparation process of the polymer is not particularly restricted, and conventionally known methods can be employed. For example, there are a process [1] in which a (meth)acryloyl group is introduced into a part of side chains of a polymer having a hydroxyl group, a process [2] in which an α,β-unsaturated monomer having a hydroxyl group is subjected to a condensation reaction with a copolymer having a carboxyl group, a process [3] in which an α,β-unsaturated monomer having an epoxy group is subjected to an addition reaction with a copolymer having a carboxyl group, and a process [4] in which an α,β-unsaturated carboxylic acid is reacted with a polymer having an epoxy group.

The preparation process of the polymer used in the present invention will be specifically described using as an example the process [4]. For example, the polymer used in the present invention can be obtained by a process in which a polymer having a glycidyl group is reacted with an α,β-unsaturated carboxylic acid such as acrylic acid or the like.

The preferable polymer having a glycidyl group is glycidyl (meth)acrylate-based polymer. As the glycidyl (meth)acrylate-based polymer, for example, a homopolymer of glycidyl (meth)acrylate and a copolymer of glycidyl (meth)acrylate and α,β-unsaturated monomer having no carboxyl group are exemplified.

As the α,β-unsaturated monomer having no carboxyl group, various (meth)acrylates, styrene, vinyl acetate, acrylonitrile and the like can be exemplified. If α,β-unsaturated monomer having a carboxyl group is used, crosslinkage is formed during the copolymerization reaction with glycidyl (meth)acrylate, and increasing in viscosity and gelling are unpreferably caused.

The other detailed condition such as a kind or an amount of the monomer or the polymer employed, have to be concretely specified for satisfying the above described requirements in conducting the methods [1] to [4]. However, a procedure for satisfying the condition is well known to those skilled in the art.

The UV absorber employed in the present invention is the bisbenzotriazole-type UV absorber represented by the formula:

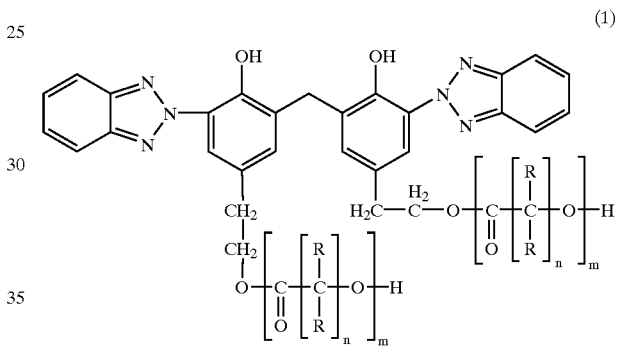

wherein R each independently represents an hydrogen atom, or an alkyl group having 1 to 10 carbon atoms, n each independently represents an integer of 4 to 8, m each independently represents an integer of 1 to 20.

In this bisbenzotriazole-type UV absorber, one bisbenzotriazole phenol acts as a balky substituent of another bisbenzotriazole phenol. Therefore, a phenolic hydroxyl group which is significantly relative to UV absorbing ability, hardly reacts with a crosslinking agent, and hardly disappears. In addition, a molecular weight of the bisbenzotriazole-type UV absorber is large. Therefore, it is hardly bled out from the surface of a protecting layer, and concentration thereof hardly becomes poor.

As a result, long period of weather resistance is easily achieved, and adhesiveness deficiency due to localization of a UV absorber at an interface with an adhesion layer, is prevented.

The bisbenzotriazole-type UV absorber has high compatibility with a general-purpose resin due to the long chain polyester group substituent. Therefore, it hardly disturbs abrasion resistance, chemical resistance, and transparency of a protecting layer. Further, the bisbenzotriazole-type UV absorber of the present invention has a reactive hydroxyl group at the end of the long chain polyester group. The hydroxyl group reacts with the polyfunctional isocyanate which is one of the active ingredients, and the bisbenzotriazole-type UV absorber is bonded with the polymer. Therefore, the bisbenzotriazole-type UV absorber is not extracted by water or an organic solvent, nor bled out. As a result, long-period weather resistance is easily achieved by the UV absorber. In addition, abrasion resistance, chemical resistance, and transparency of a protecting layer are hardly disturbed due to the highly reactive hydroxyl group of the end of the long-chain polyester group.

Specific examples of the bisbenzotriazole-type UV absorber represented by the formula (1) include 2,2'-methylenebis[6-(2H-1,2,3-benzotriazole-2-yl)-4-(glycoloyloxyethyl) phenol], 2,2'-methylenebis[6-(2H-1,2,3-benzotriazole-2-yl)-4-(3-hydroxypropanoyloxyethyl) phenol], 2,2'-methylenebis[6-(2H-1,2,3-benzotriazole-2-yl)-4-(4-hydroxybutanoyloxyethyl)phenol)], 2,2'-methylenebis[6-(2H-1,2,3-benzotriazole-2-yl)-4-(5-hydroxyheptanoyloxyethyl)phenol], 2,2'-methylenebis[6-(2H-1,2,3-benzotriazole-2-yl)-4-(6-hydroxyhexanoyloxyethyl)phenol], 2,2'-methylenebis[6-(2H-1,2,3-benzotriazole-2-yl)-4-(16-hydroxy-4,11-dioxo-3,10-dioxahexadecyl)phenol], 2,2'-methylenebis[6-(2H-1,2,3-benzotriazole-2-yl)-4-(23-hydroxy-4,11,18-trioxo-3,10,17-trioxatricosyl)phenol], 2,2'-methylenebis[6(2H-1,2,3-benzotriazole-2-yl)-4-(30-hydroxy-4,11,18,25-tetraoxo-3,10,17,24-tetraoxahexadecyl)phenol], 2,2'-methylenebis[6(2H-1,2,3-benzotriazole-2-yl)-4-(37-hydroxy-4,11,18,25,32-hptaoxo-3,10,24,31-heptaoxaheptatriacontyl)phenol, and the like. These are employed in alone or in combination of not less than two, or in combination with a commercially available general-purpose UV absorber, and may be added to the resin layer other than a protecting layer to improve weather resistance of the part other than the protecting layer.

The UV absorber employed in the present invention is contained in an amount from 2 to 40 parts by weight, preferably from 5 to 20 parts by weight based on 100 parts of the above described polymer. When the amount of the UV absorber is more than 40 parts by weight, abrasion resistance of the protecting layer becomes poor, and when lower than 2 parts by weight, sufficient UV shielding ability is not supplied to the protecting layer.

As the polyfunctional isocyanate employed together with the polymer in the present invention, known various polyisocyanates can be used. For example, isophorone diisocyanate, xylylene diisocyanate, hydrogenated xylylene diisocyanate, tolylene diisocyanate, diphenylmethane diisocyanate, 1,6-hexane diisocyanate, a trimer of the above-mentioned isocyanate, a prepolymer obtained by the reaction of polyfunctional alcohol and the above-mentioned diisocyanate and the like can be used.

The reason why the polyfunctional isocyanate is used together with the polymer in the present invention is that the isocyanate keeps tack of the protecting layer 2 before active energy ray irradiation low, and it provides resistance to the solvent which is contained in the ink of the picture layer 3 the adhesion layer 4, in laminating the picture layer 3 the adhesion layer 4 on the protecting layer 2. That is, a hydroxyl group contained in the polymer is reacted with an isocyanate group of the polyfunctional isocyanate to form a heat-crosslinked resin, which has the above-described characteristics.

This heat-crosslinked resin (polyurethane) has network structure throughout the resin. In other words, a theoretical molecular weight of the heat-crosslinked resin is infinity. Thereby, the protecting layer composed of the heat-crosslinked resin is non-flowable and tack free.

The ratio used of the polymer to the polyfunctional isocyanate is determined so that the ratio of the number of a hydroxyl group to the number of an isocyanate group in the polymer is from 1/0.01 to 1/1, preferably from 1/0.05 to 1/0.8.

The heat and active energy ray curable resin composition used for the protecting layer 2 may optionally contain the following components in addition to the polymer and the polyfunctional isocyanate, and the bisbenzotriazole-type UV absorber represented by the formula (1). That is, a reactive diluent monomer, solvent, coloring agent, UV absorber other than that represented by the formula (1), and the like.

When an electron beam is used in active energy ray irradiation, sufficient effect can be obtained without using a photopolymerization initiator. On the other hand, when ultraviolet ray is used, it is necessary to add known various photopolymerization initiators. The protecting layer 2 may be colored or not colored.

The heat and active energy ray curable resin composition used for the protecting layer 2 may optionally contain a lubricant. The reason for this is that the surface of the protecting layer becomes rough, therefore, the protecting layer becomes easy to be rolled as a sheet, the sheet becomes difficult to be blocked, and abrasion resistance and scratching resistance are improved.

As the lubricant, for example, waxes such as polyethylene wax, paraffine wax, synthesized wax, montan wax, and silicone-based, or fluorine-based synthetic resin can be used. The lubricant is contained in an amount from 0.5 to 15% by weight, preferably from 1 to 6% by weight. When the amount of the lubricant is lower than 0.5% by weight, abrasion resistance or scratching resistance of the sheet becomes poor, and when over 15% by weight, transparency of the protecting layer becomes extremely poor.

The heat and active energy ray curable resin composition used for the protecting layer 2 contains an ethylenically unsaturated group, hydroxyl group and isocyanate group. When the heat and active energy ray curable resin composition is heated, the hydroxyl group and the isocyanate group react to crosslink the resin. Further, when this resin composition is exposed to an active energy ray, the ethylenically unsaturated group is polymerized to crosslink the resin. That is, the resin composition used for the protecting layer 2 is a heat and active energy ray curable resin composition which is crosslinked by both heat and an active energy ray.

As methods for forming the protecting layer 2, there are coating methods such as a gravure coating process, roll coating process, comma coating process, lip coating process and the like, and printing methods such as a gravure printing process, screen printing process and the like. In general, the protecting layer 2 is formed in a thickness from 0.5 to 30 $\mu$m, more preferably from 1 to 6 $\mu$m. When the thickness of the protecting layer is lower than 0.5 $\mu$m, abrasion resistance or chemical resistance becomes poor, and when over 30 $\mu$m, cost of the sheet material becomes high, and when it is used as a transfer material, a flash may occur.

Then, this protecting layer 2 heated to make a heat-crosslinked resin of a heat and active energy ray curable resin composition. The heat-crosslinked resin is tack free, and it becomes easy to print an additional layer on the protecting layer 2, or to roll up the transfer material 6.

However, in this stage, an ethylenically unsaturated group contained in the heat and active energy ray curable resin composition is not substantially crosslinked, and the heat and active energy ray curable resin composition is not completely cured. In other words, it is the state of semi-cured. Therefore, the protecting layer 2 can follow up the curved surface of a molded article, and has such a flexibility which does not cause crack.

A crosslinking reaction by heating is easier to be controlled by comparison with a crosslinking reaction by active energy ray irradiation. Therefore, degree of crosslinking of the protecting layer 2 can appropriately be determined according to the kind of a resin composition used, curvature of a molded article and the like.

The picture layer 3 is formed on the protecting layer 2 usually by a printing process. Regarding to the raw material of the picture layer 3, resins such as a polyvinyl-based resin, polyamide-based resin, polyester-based resin, polyacryl-based resin, polyurethane-based resin, polyvinyl acetal-based resin, polyesterurethane-based resin, cellulose ester-based resin, alkyd resin and the like may be used as a binder, and coloring ink containing a dye or pigment having suitable color as a colorant may be used.

As methods for forming the picture layer 3, usual printing methods such as an offset printing process, gravure printing process, screen printing process and the like may be used. Particularly, an offset printing process and gravure printing process are suitable for conducting multi-color printing and gradation expression. Further, in the case of mono-color printing, coating methods such as a gravure coating process, roll coating process, comma coating process, lip coating process, and the like can also be employed.

The picture layer 3 is formed on a part of the surface or the whole surface according to a picture to be expressed. Further, the picture layer 3 may be composed of a metal film layer or composed of a combination of a printing layer and a metal film layer.

The adhesion layer 4 is one which adhere the above described respective layers on the surface of a molded article. The adhesion layer 4 is formed on the part to be adhered to the molded article of the protecting layer 2 or of the picture layer 3. That is, when whole surface is to be adhered, the adhesion layer 4 is formed on the whole surface. And, when a part of the surface is to be adhered, the adhesion layer 4 is formed partially. As the adhesion layer 4, is a heat sensitive or pressure sensitive resin suitable for the raw material of the molded article is appropriately used.

For example, when the raw material of the molded article 7 is a polyacryl-based resin, a polyacryl-base resin may be used. Further, when the raw material of the molded article 7 is a polyphenylene oxide-polystyrene-based resin, polycarbonate-based resin, styrene copolymer-based resin or polystyrene-based blend resin, a polyacryl-based resin, polystyrene-based resin, polyamide-based resin and the like which has affinity with the resins may be used. Further, the raw material of the molded article 7 is a polypropylene resin, a chlorinated polyolefin resin, chlorinated ethylene-vinyl acetate copolymer resin, cyclized rubber and cumarone-indene resin can be used.

As a process for forming the adhesion layer 4, there are coating methods such as a gravure coating process, roll coating process, comma coating process and the like, and printing methods such as a gravure coating process, screen printing process and the like. However, if the protecting layer 2 or the picture layer 3 has sufficient adhesiveness to the molded article 7, the adhesion layer 4 may be omitted.

Figure 2:
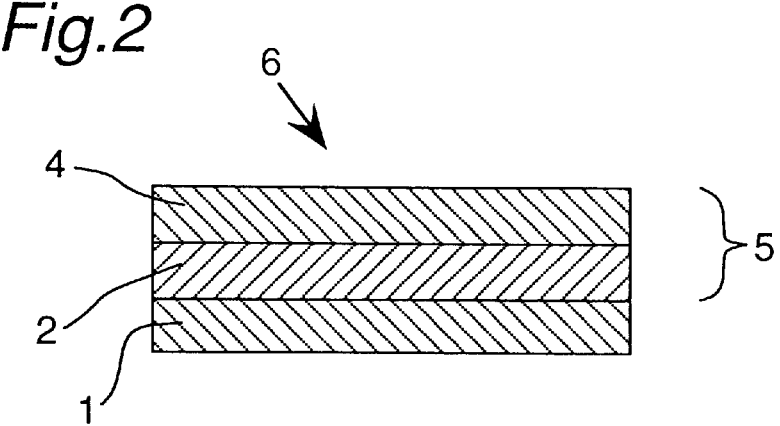
FIG. 2 is a schematic sectional view which shows another example of the transfer material according to the present invention.

In the present invention, construction of the transfer layer 5 is not restricted to the above described embodiments. For example, when only surface protection is intended in employing the transfer material 6 by utilizing the background pattern and transparency of the molded article 7, the protecting layer 2 adhesion layer 4 can be formed in order on the substrate sheet 1 as described above, and the picture layer can be omitted as shown in FIG. 2.

Further, an anchor layer may be formed among the transfer layer 5. The anchor layer is a resin layer which enhances adhesiveness between the protecting layer 5 and protects the molded article 7 the picture layer 3 from a chemical agent. For example, thermoplastic resins such as a two-pack setting urethane resin, melamine-based or epoxy-based thermosetting resin, vinyl chloride copolymer resin and the like can be used. As a process for forming the anchor layer, there are coating methods such as a gravure coating process, roll coating process, comma coating process and the like and printing methods such as a gravure printing process, screen printing process and the like.

A process for preparing a molded article excellent in abrasion resistance and chemical resistance using the transfer material 6 of the present invention will be described bellow.

Figure 3:
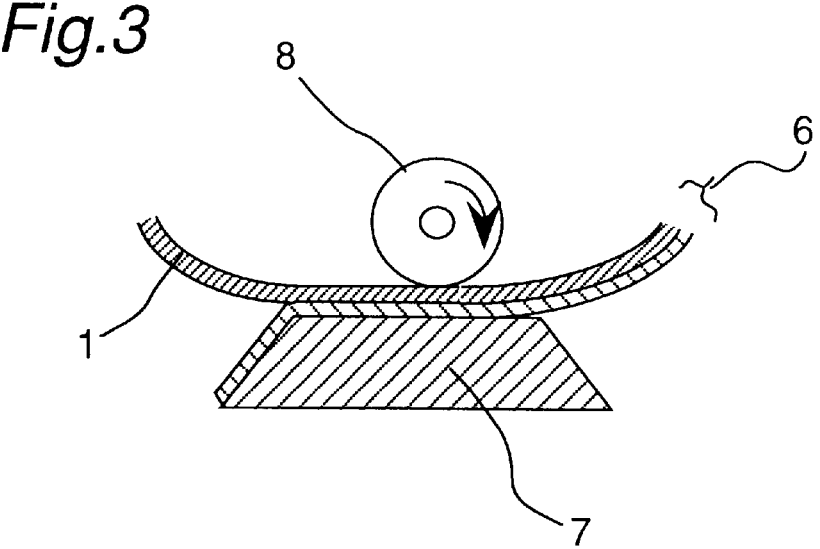
FIG. 3 is a schematic view which shows one example of a preparation process for a molded article excellent in abrasion resistance and chemical resistance using the transfer material according to the present invention.

First, as shown in FIG. 3, the transfer material 6 is placed on the molded article 7 so that the adhesion layer thereof faces the molded article (facing below).

Then, by using a transference machine such as a roll transference machine equipped with a heat resistant rubber-like elastomer 8, for example a silicon rubber, up-down transference machine, and the like, heat and/or pressure is applied to the transfer material 6 from the side of the substrate sheet 1 through the heat resistant rubber-like elastomer 8 set at the conditions of a temperature from 80 to 260° C. and a pressure from 50 to 200 kg$^2$. According to the procedure, the adhesion layer 4 is adhered to the surface of the molded article 7.

Then, the substrate sheet 1 is pulled after cooling, peeling occurs in the boundary surface between the substrate sheet 1 is the protecting layer 2. If a releasing layer is formed on the substrate sheet 1, when the substrate sheet 1 is pulled, peeling occurs in the boundary surface between the releasing layer and the protecting layer 2. Finally, an active energy ray is irradiated to the protecting layer 2 transferred to the molded article 7 to cure completely.

As the active energy ray, an electron beam, UV ray, γ-ray and the like can be used. The irradiation condition may be determined according to the kind of the heat and active energy ray curable resin composition.

Regarding the molded article 7, though the raw material thereof is not restricted, there can be exemplified in particular a resin molded article 7, wooden article or composite article thereof. These may be transparent, translucent or opaque. The molded article 7 may be colored or not colored. The example of the resin includes general-purpose resins such as a polystyrene-based resin, polyolefin-based resin, ABS resin, AS resin, AN resin and the like.

Further, there can be used general-purpose engineering resins such as a polyphenylene oxide-polystyrene-based resin, polycarbonate-based resin, polyacetal-based resin, acryl-based resin, polycarbonate modified polyphenylene ether resin, polyetylene terephthalate resin, polybutylene terephthalate resin, ultra high molecular weight polyethylene resin and the like, and super engineering resins such as a polysulfone resin, polyphenylene sulfide-based resin, polyphenylene oxide-based resin, polyacrylate resin, polyether imide resin, polyimide resin, liquid crystal polyester resin, polyaryl-based heat resistant resin and the like. Further, a composite resin obtained by adding a reinforcing material such as a glass fiber, inorganic filler or the like can also be used.

A molded article excellent in abrasion resistance and chemical resistance can also be prepared, by utilizing a simultaneous molding and transference process in which transference is conducted simultaneously with molding by injection molding, using the transfer material 6 of the present invention.

Figure 4:
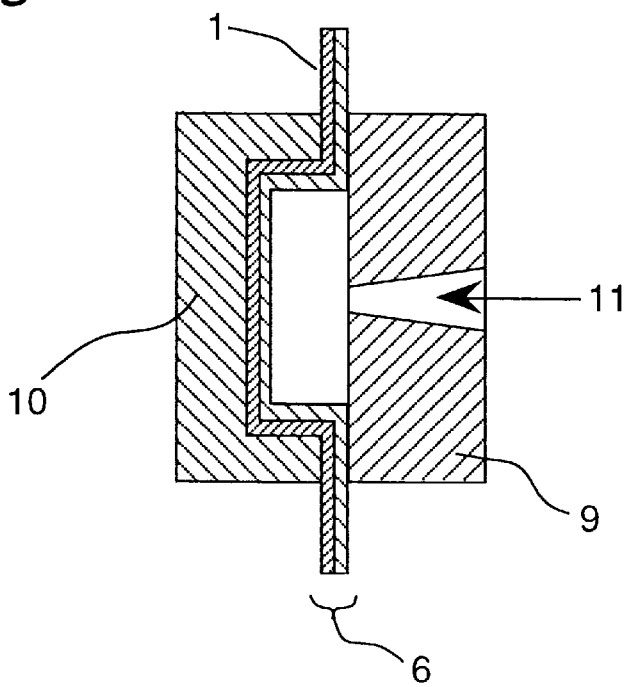
FIG. 4 is a schematic view which shows another example of a preparation process for a molded article excellent in abrasion resistance and chemical resistance using the transfer material according to the present invention.

First, as shown in FIG. 4, into a mold comprising the movable mold 9 the fixed mold 10 fed the transfer material 6 so that the protecting layer 2 faces inside, that is so that the substrate sheet 1 contacts the fixed mold 10. In this process, separate transfer materials 6 may be fed in one by one, or necessary portions of a long transfer material 6 may be fed in intermittently. When the long transfer material 6 is used, it is preferable to make the position of the picture layer 3 of the transfer material 6 correspond to the mold by using a feeding apparatus having positioning mechanism.

Further, if the position of the transfer material 6 is detected by a sensor when the transfer material 6 is fed in intermittently and thereafter the transfer material 6 is fixed by the movable mold 9 the fixed mold 10, the transfer material 6 can be fixed constantly at the same position and deviation of the picture layer 3 does not occur, therefore such process is convenient.

The mold is closed, through a gate formed in the movable mold 9, the molten resin 11 injected into the mold to fill it, a molded article is formed, and simultaneously the transfer material 6 is adhered to the surface of it. Then, the resin molded article 7 cooled, the mold is opened and the resin molded article 7 took out.

Finally, the substrate sheet 1 peeled, and the protecting layer 2 cured completely by irradiation of an active energy ray. Otherwise, the substrate sheet 1 may be peeled after irradiation of an active energy ray.

As an another embodiment of the present invention, there is an another process in which a molded article excellent in abrasion resistance and chemical resistance is prepared. In this process, there is used a surface protecting sheet comprising a substrate sheet having no releasing property and a protecting layer formed on it.

Figure 6:
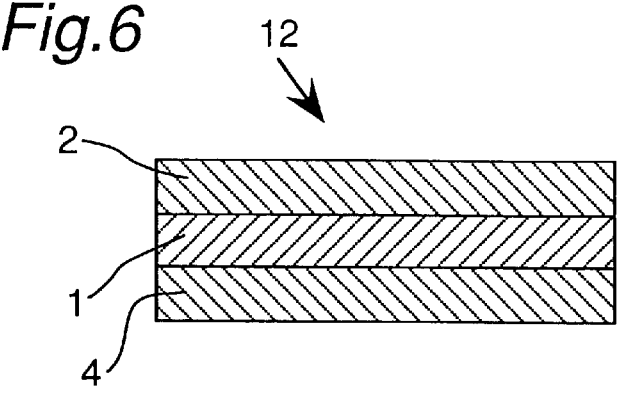
FIG. 6 is a schematic sectional view which shows another example of the surface protecting sheet according to the present invention.

FIG. 6 is a schematic sectional view which shows an example of the surface protecting sheet according to the present invention. The surface protecting sheet comprises a substrate sheet having no releasing property 1, the above described protecting layer 2 formed on one surface of the substrate sheet, and an adhesion layer 4 formed on another surface of the substrate sheet.

Figure 5:
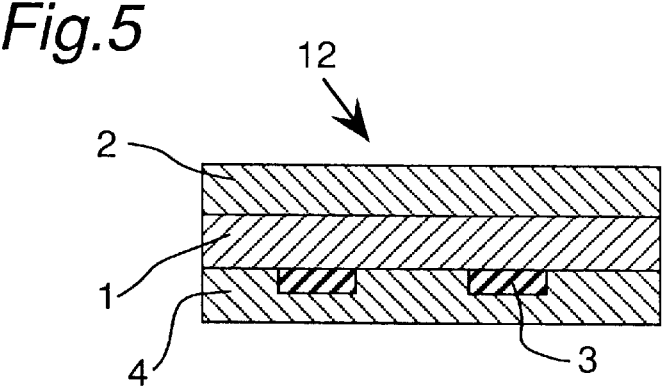
FIG. 5 is a schematic sectional view which shows one example of the surface protecting sheet according to the present invention.

FIG. 5 is a schematic sectional view which shows another example of the surface protecting sheet according to the present invention. This example further comprises a picture layer 3 formed between the substrate layer and the adhesion layer.

The surface protecting sheet is prepared using the same procedure and material as the transfer material except that a material having no releasing property is used as a substrate sheet and the adhesion layer is not formed on the protecting layer.

As the substrate sheet having no releasing property, a sheet of an acryl-based resin, polycarbonate-based resin, vinyl chloride-based resin, urethane-based resin, polyester-based resin and the like can be used.

The adhesion layer is formed using the same procedure and material as the transfer material except that it is formed on the surface of the substrate sheet.

Figure 7:
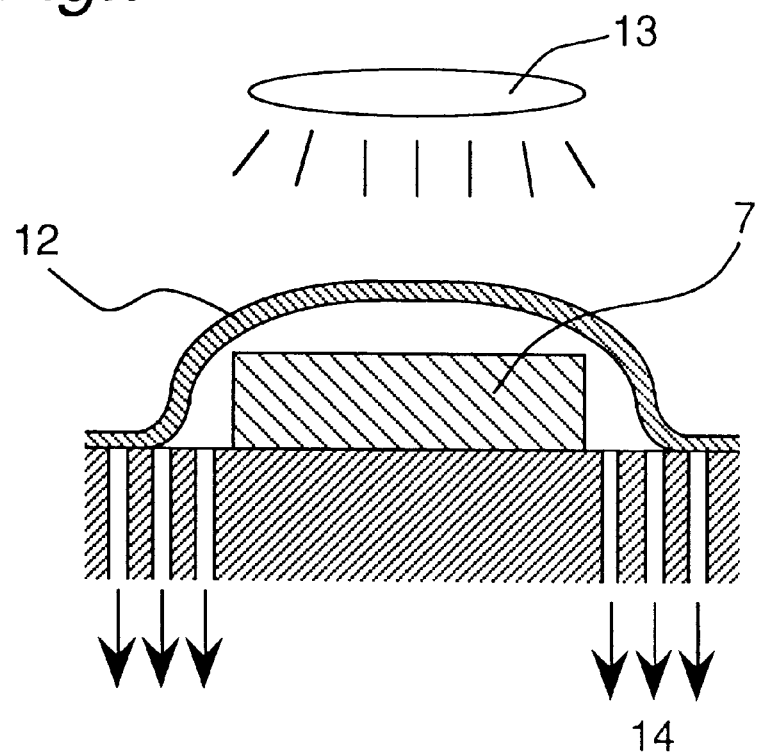
FIG. 7 is a schematic view which shows one example of a preparation process for a molded article excellent in abrasion resistance and chemical resistance using the surface protecting sheet according to the present invention.

First, the surface protecting sheet 12 placed to cover the molded article 7 so that the protecting layer thereof faces above as shown in FIG. 7. Then, by using a heater 13 the like, the surface protecting sheet 12 heated to soften, and vacuum suction 14 conducted from below. By this procedure, the substrate sheet or the adhesion layer formed on it is adhered to the surface of the molded article 7. Finally, the protecting layer is cured by active energy ray irradiation.

Otherwise, pressure may be applied from the upper side of the surface protecting sheet 1 in addition to the vacuum suction 14 from below. Pressure can be applied using a liquid or the like directly or further via a flexible sheet and the like.

As in the case of the transfer material, a molded article excellent in abrasion resistance and chemical resistance can also be prepared, by utilizing a simultaneous process in which adhesion is conducted simultaneously with molding by injection molding (the insert molding process).

Figure 8:
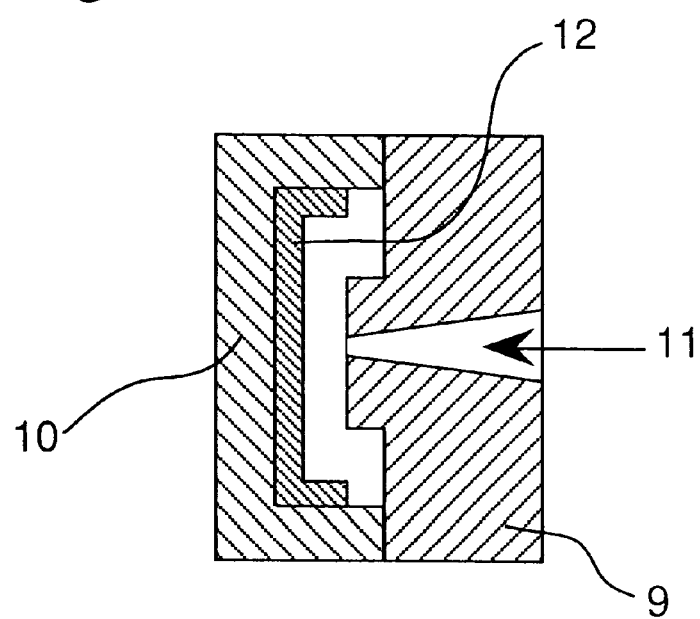
FIG. 8 is a schematic view which shows one example of is a preparation process for a molded article excellent in abrasion resistance and chemical resistance using the surface protecting sheet according to the present invention.

First, as shown in FIG. 8, into a mold comprising the movable mold 9 the fixed mold 10 fed the surface protecting sheet 12 so that the protecting layer faces outside, that is so that the protecting layer contacts the fixed mold 10. In this process, the same procedure as in the preparation process using the transfer material may be used.

The mold is closed, through a gate formed in the movable mold 9, the molten resin 11 injected into the mold to fill it, a molded article is formed, and simultaneously the substrate sheet or the adhesion layer formed thereon of the surface protecting sheet 12 adhered to the surface of it. Then, the resin molded article is cooled, the mold is opened and the resin molded article is took out. Finally, the protecting layer is cured by active energy ray irradiation.

EXAMPLE

The present invention will be further specifically described by the following examples and comparative examples, however, the present invention is not restricted to them. In the examples, all "parts" and "%" are by weight.

Synthesis Example 1

129.3 g of 2,2'-methylenebis[6-(2H-1,2,3-benzotriazole-2-yl)-4-(2-hydroxyethyl)phenol] (Trade name "RUVA-100" available from Otsuka Kagaku K.K.), 170.3 g of ε-caprolactone (available from Daicel Kagaku Kogyo K.K.), and 50 ppm of mono-n-butyltin salt of fatty acid (Trade name "SCAT-24" available from Sankyo Yuki Gosei K.K.) were charged to a four necked flask equipped with a cooling tube, a nitrogen introducing tube, a thermometer, and a stirrer.

The content was kept at 150° C., and reacted for 6 hours to obtain objective 2,2'-methylenebis[6-(2H-1,2,3-benzotriazole-2-yl)-4-(23-hydroxy-4,11,18-trioxo-3,10,17-trioxatricosyl)phenol] having an acid value (mg KOH/g) of 1.8, a viscosity of 2645 cp (60° C.), a number average molecular weight of 1391, a weight average molecular weight of 1688, Mw/Mn of 1.213 as viscous oil (98% yield).

Examples 1 to 3, and Comparative Examples 1 to 4

A transfer material of the present invention is described in the examples.

Example 1

A polyester resin film having a thickness of 38 μm was used as a substrate sheet. A melamine resin-based releasing agent was applied on the substrate sheet in a thickness of 1 μm by using the gravure printing process to form a releasing layer, and a protecting layer composed of 200 parts (solid content: 100 parts) of varnish A described below, 5 parts of 1,6-hexane diisocyanate trimer (trade name: CORONATE HX, available from Nippon Polyurethane Kogyo K.K.), and 10 parts of the UV absorber prepared in Synthesis Example 1, was formed thereon by using the gravure printing process. The thickness of the protecting layer was 5 μm.

The protecting layer was semi-cured by heating at 150° C. for 20 seconds, and a picture layer composed of an acryl-based ink and an adhesion layer composed of an acrylic resin were formed in order by printing according to the gravure printing process to obtain a transfer material.

The varnish A was obtained by the following process. First, into a reacting apparatus equipped with a stirring apparatus, cooling tube, dropping funnel and nitrogen introducing tube were charged 175 parts of glycidyl methacrylate (hereinafter, referred to as GMA), 75 parts of methyl methacrylate (hereinafter, referred to as MMA), 1.3 parts of lauryl mercaptan, 1000 parts of butyl acetate and 7.5 parts of 2,2'-azobisisobutyronitrile(hereinafter, referred to as AIBN), and they were heated until the temperature in the content rose to about 90° C. under nitrogen flow over 1 hour and kept at this temperature for 1 hour.

Then, from a dropping funnel previously charged with a mixture composed of 525 parts of GMA, 225 parts of MMA, 3.7 parts of lauryl mercaptan and 22.5 parts of AIBN, the mixture was dropped into the reacting apparatus over about 2 hours under nitrogen flow. The resulting mixture was kept at the same temperature for 3 hours. To this was added 10 parts of AIBN and the mixture was kept at the temperature for 1 hour. Then, the mixture was heated up to 120° C., and kept at the temperature for 2 hours.

After cooling to 60° C., the nitrogen introducing tube was changed to an air introducing rube, and 355 parts of acrylic acid (hereinafter, referred to as AA), 2.0 parts of methoquinone and 5.4 parts of triphenylphosphine were charged and mixed, then, the mixture was heated to 110° C. under air bubbling. The mixture was kept at the same temperature for 8 hours, then, 1.4 parts of methoquinone was charged. The mixture was cooled, and to this was added ethyl acetate until the nonvolatile content reached to 50% to obtain the varnish A.

The polymer contained in the varnish A had an acryl equivalent weight of 270 g/eq, a hydroxyl value of 204 and a weight-average molecular weight (in terms of styrene by GPC) of 18000.

This transfer material was transferred to the surface of a molded article by utilizing the simultaneous transference and molding process, then, the substrate sheet was peeled, and ultraviolet ray was irradiated to completely cure the protecting layer. The molding conditions included a resin temperature of 240° C., a mold temperature of 55° C., and a resin pressure of about 300 kg/cm².

The raw material of the molded article was an acrylic resin, and it was molded into a tray-shaped article having a longitudinal length of 95 mm, a transverse length of 65 mm, a rising edge height of 4.5 mm, and R at the corner part of 2.5 mm. Irradiation conditions included 120 W/cm, six lamps, a lamp height of 10 cm and a belt speed of 15 m/min.

Example 2

A polyester resin film having a thickness of 38 μm was used as a substrate sheet. A melamine resin-based releasing agent was applied on the substrate sheet in a thickness of 1 μm by using the gravure printing process to form a releasing layer, and a protecting layer composed of 200 parts (solid content: 100 parts) of the varnish A, 10 parts of 1,6-hexane diisocyanate trimer (trade name: CORONATE HX, available from Nippon Polyurethane Kogyo K.K.), and 10 parts of the UV absorber prepared in Synthesis Example 1, was formed thereon by using the lip coating process. The thickness of the protecting layer was 5 μm. The protecting layer was semi-cured by heating at 150° C. for 20 seconds, and an anchor layer composed of an urethane-based ink, a picture layer composed of an acryl-based ink and an adhesion layer composed of an acrylic resin were formed in order by printing according to the gravure printing process to obtain a transfer material.

This transfer material was transferred to the surface of a molded article according to the same manner as in Example 1, by utilizing the simultaneous transference and molding process, then, the substrate sheet was peeled, and ultraviolet ray was irradiated to completely cure the protecting layer. Irradiation conditions included 120 W/cm, two lamps, a lamp height of 10 cm and a belt speed of 2.5 m/min.

Example 3

The procedure was conducted according to the same manner as in Example 1 except that varnish B was used instead of the varnish A of Example 1. The varnish B was prepared by changing the amount used of the monomer (GMA) in the initial charging to 250 parts, the amount used of the monomer (GMA) in the later charging to 750 parts, and the amount used of AA to 507 parts. The polymer contained in the varnish B had an acryl equivalent weight of 214 g/eq, a hydroxyl value of 262 a weight-average molecular weight of 20000.

Comparative Example 1

The procedure was conducted according to the same manner as in Example 3, except that 10 parts of a benzophenone-type UV absorber (Trade name "TINUVIN-326", available from Ciba Specialty Chemicals Co., Ltd.) was employed instead of the UV absorber of Example 3.

Comparative Example 2

The procedure was conducted according to the same manner as in Example 3, except that 10 parts of a benzophenone-type UV absorber (Trade name "SUMISORB 130", available from Sumitomo Kagaku Kogyo K.K.) was employed instead of the UV absorber of Example 3.

Comparative Example 3

The procedure was conducted according to the same manner as in Example 3, except that 10 parts of hydroxyphenylbenzotriazole of the formula:

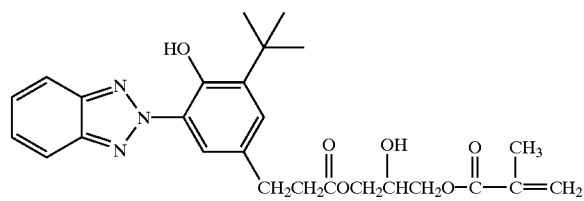

was employed instead of the UV absorber of Example 3.

Comparative Example 4

The procedure was conducted according to the same manner as in Example 3, except that 10 parts of hydroxyphenyl-S-triazine of the formula:

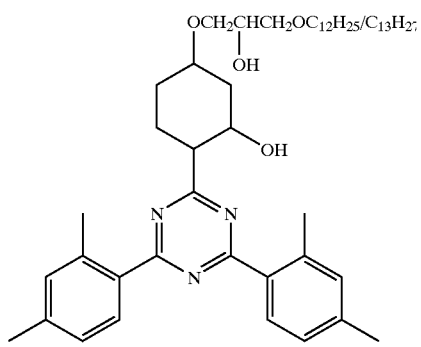

was employed instead of the UV absorber of Example 3.

Test of Performance

Transparency, crack resistance, chemical resistance, abrasion resistance, and weather resistance were evaluated with respect to the above described Examples 1 to 3, and Comparative Examples 1 to 4 (Table 1).

Transparency was evaluated by observing the occurrence of bleed on the surface of the molded article according to the following evaluation standards judged by naked eyes: ○ no occurrence, Δ occurred a little, X occurred much.

Crack resistance was evaluated by observing the condition of the curved surface of the molded article according to the following evaluation standards judged by naked eyes: ○ no occurrence, Δ occurred a little, X occurred much.

Chemical resistance was evaluated by impregnating a gauze with methanol, observing the condition of the surface after 50 times reciprocating abrasion according to the following evaluation standards judged by naked eyes: ⊚ no occurrence, ○ little occurrence, Δ occurred a few, X occurred much.

Abrasion resistance was evaluated by applying a load (100 g, 300 g) to a #000 steal wool of 1 cm square, observing the degree to be injured of the surface after 200 times reciprocating movements at the condition of 2 reciprocation/second and a moving distance of 2 cm according to the following evaluation standards judged by naked eyes: ⊚ very good, ○ good, Δ relatively bad, X bad.

Weather resistance was evaluated by irradiating with a UV ray at an intensity of 100 mW/cm² for 50 hours at 75° C. with a metal halide lamp (Trade name "I SUPER UV TESTER", available from Iwasaki Denki K.K.), and thereafter observing the formation of cracks, or the adhesiveness between layers, and measuring the difference of E value between before and after the 50 hours irradiation (i.e., ΔE). The smaller the ΔE value, the more excellent in weather resistance.

TABLE 1

| | Transparency | Crack resist. | Chemical resist. | Abrasion resist. 100 g | Abrasion resist. 300 g | Weather resist. ΔE |
|---|---|---|---|---|---|---|
| Example 1 | ○ | ○ | ○ | ○ | Δ | 3 |
| Example 2 | ○ | ○ | ○ | ○ | Δ | 4 |
| Example 3 | ○ | ○ | ○ | ○ | ○ | 3 |
| C. Ex. 1 | Δ | ○ | Δ | Δ | Δ | 31 |
| C. Ex. 2 | Δ | ○ | Δ | Δ | Δ | 29 |
| C. Ex. 3 | ○ | ○ | Δ | ○ | Δ | 15 |
| C. Ex. 4 | ○ | ○ | Δ | ○ | Δ | 15 |

From the evaluation results of Table 1, the followings are evident.

That is, the molded articles of Examples 1 to 3 having as the most outer layer a protecting layer composed of a crosslinked product of the heat and active energy ray curable resin composition comprising, as an active ingredient, a polymer having an acryl equivalent weight from 100 to 300 g/eq, a hydroxyl value from 20 to 500 a weight-average molecular weight from 5000 to 50000, a polyfunctional polyisocyanate, a specific UV absorber, are excellent in transparency, abrasion resistance, chemical resistance, weather resistance, and have no crack in the curved part of the molded article.

Whereas, although the molded articles of Comparative Examples 1 to 4 have no clack, they were poor in abrasion resistance, chemical resistance, and weather resistance. The molded articles of Comparative Examples 1 and 2 are also poor in transparency.

Examples 4 to 6, and Comparative Examples 5 to 8

A surface protecting sheet of the present invention is described in the examples.

Example 4

An acrylic resin film having a thickness of 125 μm was used as a substrate sheet. A picture layer composed of an acryl-based ink and an adhesion layer composed of an acrylic resin were formed by printing on the one surface of the substrate sheet in order according to the gravure printing process. A protecting layer obtained by blending 200 parts (solid component: 100 parts) of the above described varnish A, 5 parts of 1,6 hexane diisocyanate trimer (trade name: CORONATE HX, available from Nippon Polyurethane Kogyo K.K.), 10 parts of the UV absorber prepared in Synthesis Example 1, and 5 parts of a photopolymerization initiator (Trade name "IRGACURE 184", available from Ciba Specialty Chemicals Co., Ltd.), were formed by printing on the opposite surface of the substrate sheet according to the gravure printing process. The thickness of the protecting layer was 5 μm. The protecting layer was semi-cured by heating at 80° C. for 30 seconds to obtain a surface protecting sheet.

This surface protecting sheet was adhered to the surface of a molded article by utilizing the insert molding process, then it was irradiated with ultraviolet ray. The molding conditions included a resin temperature of 220° C., a mold temperature of 55° C., and a resin pressure of about 300 kg/cm².

The raw material of the molded article was an acrylic resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, six lamps, a lamp height of 10 cm and a belt speed of 15 m/min.

Example 5

An acrylic resin film having a thickness of 125 μm was used as a substrate sheet. A picture layer composed of an acryl-based ink and an adhesion layer composed of an acrylic resin were formed by printing on the one surface of the substrate sheet in order according to the gravure printing process. A protecting layer obtained by blending 200 parts (solid component: 100 parts) of the varnish A obtained in Example 1, 10 parts of 1,6-hexane diisocyanate trimer (trade name: CORONATE HX, available from Nippon Polyurethane Kogyp K.K.), 10 parts of the UV absorber prepared in Synthesis Example 1, and 5 parts of a photopolymerization initiator (Trade name "IRGACURE 184", available from Ciba Specialty Chemicals Co., Ltd.), was formed by printing on the opposite surface of the substrate sheet according to the gravure coating process. The thickness of the protecting layer was 5 μm. The protecting layer was semi-cured by heating at 80° C. for 30 seconds to obtain a surface protecting sheet.

This surface protecting sheet was adhered to the surface of a molded article by utilizing the insert molding process according to the same manner as in Example 1, then it was irradiated with ultraviolet ray. Irradiation conditions included 120 W/cm, two lamps, a lamp height of 10 cm and a belt speed of 2.5 m/min.

Example 6

The procedure was conducted according to the same manner as in Example 4 except that the above described varnish B was used instead of the above described varnish A.

Comparative Example 5

The procedure was conducted according to the same manner as in Example 6, except that 10 parts of a benzophenone-type UV absorber (Trade name "TINUVIN-326", available from Ciba Specialty Chemicals Co., Ltd.) was employed instead of the UV absorber of Example 6.

Comparative Example 6

The procedure was conducted according to the same manner as in Example 6, except that 10 parts of a benzophenone-type UV absorber (Trade name "SUMI-SORB 130", available from Sumitomo Kagaku Kogyo K.K.) was employed instead of the UV absorber of Example 6.

Comparative Example 7

The procedure was conducted according to the same manner as in Example 6, except that 10 parts of hydroxyphenylbenzotriazole which is the same as that employed in Comparative Example 3, was employed instead of the UV absorber of Example 6.

Comparative Example 8

The procedure was conducted according to the same manner as in Example 6, except that 10 parts of hydroxyphenyl-S-triazine which is the same as that employed in Comparative Example 4, was employed instead of the UV absorber of Example 6.

Test of Performance

Transparency, crack resistance, chemical resistance, and abrasion resistance, and weather resistance were evaluated with respect to the above described Examples 4 to 6, and Comparative Examples 5 to 8 (Table 2).

Transparency was evaluated by observing the occurrence of bleed on the surface of the molded article according to the following evaluation standards judged by naked eyes: ○ no occurrence, Δ occurred a little, X occurred much.

Crack resistance was evaluated by observing the condition of the curved surface of the molded article according to the following evaluation standards judged by naked eyes: ○ no occurrence, Δ occurred a little, X occurred much.

Chemical resistance was evaluated by impregnating a gauze with methanol, observing the condition of the surface after 50 times reciprocating abrasion according to the following evaluation standards judged by naked eyes: ⊚ no occurrence, ○ little occurrence, Δ occurred a few, X occurred much.

Abrasion resistance was evaluated by applying a load (100 g, 300 g) to a #000 steal wool of 1 cm square, observing the degree to be injured of the surface after 200 times reciprocating movements at the condition of 2 reciprocation/ second and a moving distance of 2 cm according to the following evaluation standards judged by naked eyes: ⊚ very good, ○ good, Δ relatively bad, X bad.

Weather resistance was evaluated by irradiating with a UV ray at an intensity of 100 mW/cm$^2$ for 50 hours at 75° C. with a metal halide lamp (Trade name "I SUPER UV TESTER", available from Iwasaki Denki K.K.), and thereafter observing the formation of cracks, or the adhesiveness between layers, and measuring the difference of E value between before and after the 50 hours irradiation (i.e., ΔE). The smaller the ΔE value, the more excellent in weather resistance.

TABLE 2

| | Transparency | Crack resist. | Chemical resist. | Abrasion resist. 100 g | Abrasion resist. 300 g | Weather resist. Δ E |
|---|---|---|---|---|---|---|
| Example 4 | ○ | ○ | ○ | ○ | Δ | 3 |
| Example 5 | ○ | ○ | ○ | ○ | Δ | 4 |
| Example 6 | ○ | ○ | ○ | ○ | ○ | 3 |
| C. Ex. 5 | Δ | ○ | Δ | Δ | Δ | 31 |
| C. Ex. 6 | Δ | ○ | Δ | Δ | Δ | 29 |
| C. Ex. 7 | ○ | ○ | Δ | ○ | Δ | 15 |
| C. Ex. 8 | ○ | ○ | Δ | ○ | Δ | 15 |

From the evaluation results of Table 2, the followings are evident.

That is, the molded articles of Examples 4 to 6 having as the most outer layer a protecting layer composed of a crosslinked product of the heat and active energy ray curable resin composition comprising, as an active ingredient, a polymer having an acryl equivalent weight from 100 to 300 g/eq, a hydroxyl value from 20 to 500 a weight-average molecular weight from 5000 to 50000, a polyfunctional isocyanate, and a specific UV absorber, are excellent in abrasion resistance and chemical resistance, and have no crack in the curved part of the molded article.

Whereas, although the molded articles of Comparative Examples 5 to 8 have no clack, they were poor in abrasion resistance, chemical resistance, and weather resistance. The molded articles of Comparative Examples 5 and 6 are also poor in transparency.

Technical Effects of the Invention

The sheet material of the present invention has a protecting layer which is composed of a heat reactant of a heat and active energy ray curable resin composition comprising, as an active ingredient, a polymer having a (meth)acryl equivalent weight from 100 to 300 g/eq, a hydroxyl value from 20 to500 a weight-average molecular weight from 5000 to 50000, a polyfunctional isocyanate. This protecting layer is transferred to the surface of a molded article, and then is cured by active energy ray irradiation. Therefore, a molded article excellent in abrasion resistance and chemical resistance can be obtained, and crack is not caused in the curved part of the molded article. Further, since the protecting layer is semi-cured by heat in transfer material preparation, a large scale active energy ray irradiation apparatus is not required in active energy ray irradiation to realize low cost.

In addition, the heat and active energy ray curable resin composition also comprises, as an active ingredient, a specific UV absorber. Therefore, the protecting layer easily supply sufficient long period weather resistance to the beneath layer, and abrasion resistance, chemical resistance, and transparency of the protecting layer are not disturbed.

What is claimed is:

1. A transfer material comprising at least a substrate sheet having releasing property, and a protecting layer formed on one surface of the substrate sheet, wherein the protecting layer is composed of an active energy ray curable resin, the active energy ray curable resin being obtained by heat-crosslinking a heat and active energy ray curable resin composition which comprises, as an active ingredient, a polymer having a (meth)acryl equivalent weight from 100 to 300 g/eq, a hydroxyl value from 20 to 500 a weight-average molecular weight from 5000 to 50000; a polyfunctional isocyanate; and a UV absorber;

characterized in that the UV absorber is a bisbenzotriazole-type UV absorber represented by the formula:

(1)

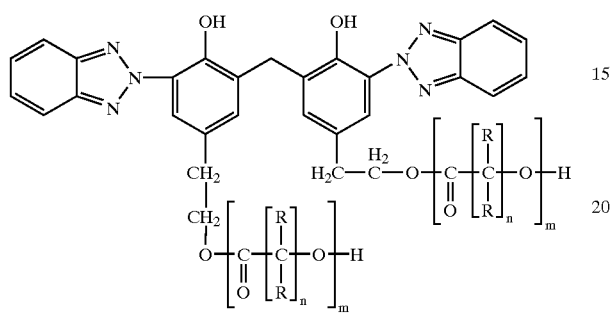

wherein R each independently represents a hydrogen atom, or an alkyl group having 1 to 10 carbon atoms, n each independently represents an integer of 4 to 8, m each independently represents an integer of 1 to 20.

2. The transfer material according to claim 1, wherein the polymer is a reaction product obtained by an addition reaction of a glycidyl (meth)acrylate-based polymer, and α,β-unsaturated monocarboxylic acid.

3. The transfer material according to claim 2, wherein the glycidyl (meth)acrylate-based polymer is a homopolymer of glycidyl (meth)acrylate, or a copolymer of glycidyl (meth)acrylate and α,β-unsaturated monomer having no carboxyl group.

4. The transfer material according to claim 1 further comprising an adhesion layer formed on the protecting layer.

5. The transfer material according to claim 1 further comprising a picture layer and an adhesion layer formed in order on the protecting layer.

6. A process for preparing a molded article excellent in abrasion resistance, chemical resistance, and weather resistance comprising the steps of:

adhering a transfer material according to claim 1 along the surface of a molded article;

releasing the substrate sheet to transfer the protecting layer on the molded article; and irradiating the protecting layer transferred to said molded article with an active energy ray.

7. The process of claim 6, wherein the step of adhering the transfer material along the surface of the molded article, is conducted by the process comprising the steps of:

placing the transfer material in a mold so that the protecting layer thereof faces inside; and injecting a resin into cavity for filling, molding and simultaneously adhering the protecting layer of the transfer material to the surface of the molded resin.

8. A process for preparing a molded article excellent in abrasion resistance, chemical resistance, and weather resistance, comprising the steps of:

(i) adhering a surface protecting sheet comprising at least a substrate sheet having no releasing property, a protecting layer formed on one surface of the substrate sheet, and an adhesive layer formed on another surface of the substrate sheet, wherein the protecting layer is composed of an active energy ray curable resin, the active energy ray curable resin being obtained by heat-crosslinking a heat and active energy ray curable resin composition which comprises, as an active ingredient, a polymer having a (meth)acryl equivalent weight from 100 to 300 g/eq, a hydroxyl value from 20 to 500 a weight-average molecular weight from 5000 to 50000; a polyfunctional isocyanate; and a UV absorber;

characterized in that the UV absorber is a bisbenzotriazole-type UV absorber represented by the formula:

(1)

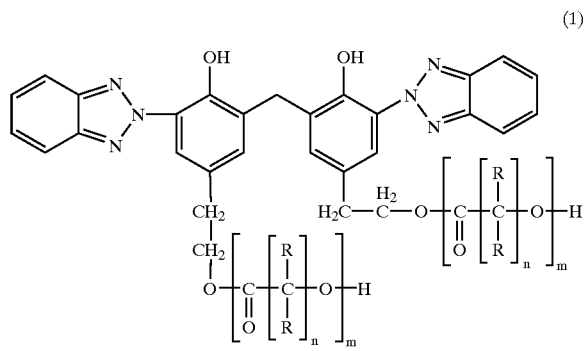

wherein R each independently represents a hydrogen atom, or an alkyl group having 1 to 10 carbon atoms, n each independently represents an integer of 4 to 8, m each independently represents an integer of 1 to 20, along the surface of a molded article; and (ii) irradiating the protecting layer of the surface protecting sheet with an active energy ray.

9. The process according to claim 8, wherein the step of adhering the surface protecting sheet along the surface of the molded article, is conducted by the process comprising the steps of:

placing the surface protecting sheet over the molded article;

softening the surface protecting sheet by heating;

vacuum-sucking the surface protecting sheet from below.

10. The process according to claim 8, wherein the step of adhering the surface protecting sheet along the surface of the molded article, is conducted by the process comprising the steps of:

placing the surface protecting sheet in a mold so that the protecting layer thereof faces outside; and injecting a resin into cavity for filling, molding and simultaneously adhering the surface protecting sheet to the surface of the molded resin.

11. The process according to claim 8, wherein the polymer is a reaction product obtained by an addition reaction of a glycidyl (meth)acrylate-based polymer, and α,β-unsaturated monocarboxylic acid.

12. The process according to claim 11, wherein the glycidyl (meth)acrylate-based polymer is a homopolymer of glycidyl (meth)acrylate, or a copolymer of glycidyl (meth)acrylate and α,β-unsaturated monomer having no carboxyl group.

13. The process according to claim 8, wherein the surface protecting sheet further comprises a picture layer formed between the substrate sheet and the adhesion layer.

* * * * *